(12) United States Patent
Lee et al.

(10) Patent No.: US 9,666,909 B2
(45) Date of Patent: May 30, 2017

(54) ELECTRODE LAMINATE COMPRISING ELECTRODES WITH DIFFERENT SURFACE AREAS AND SECONDARY BATTERY EMPLOYED WITH THE SAME

(71) Applicant: LG Chem, Ltd., Seoul (KR)

(72) Inventors: Min Hee Lee, Daejeon (KR); Jae Hyun Lee, Daejeon (KR); Jihyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/652,862

(22) PCT Filed: Apr. 8, 2014

(86) PCT No.: PCT/KR2014/003029
§ 371 (c)(1),
(2) Date: Jun. 17, 2015

(87) PCT Pub. No.: WO2014/168398
PCT Pub. Date: Oct. 16, 2014

(65) Prior Publication Data
US 2016/0087312 A1    Mar. 24, 2016

(30) Foreign Application Priority Data
Apr. 11, 2013 (KR) .................. 10-2013-0039687

(51) Int. Cl.
*H01M 4/13* (2010.01)
*H01M 10/0585* (2010.01)
(Continued)

(52) U.S. Cl.
CPC ..... *H01M 10/0585* (2013.01); *H01M 2/1673* (2013.01); *H01M 4/485* (2013.01);
(Continued)

(58) Field of Classification Search
CPC ......... H01M 10/0459; H01M 10/0525; H01M 10/0583; H01M 10/0585; H01M 2/1673;
(Continued)

(56) References Cited

U.S. PATENT DOCUMENTS

| | | | |
|---|---|---|---|
| 6,423,449 B1 | 7/2002 | Hong | |
| 2002/0081485 A1* | 6/2002 | Takekawa | H01M 10/0525 429/60 |

(Continued)

FOREIGN PATENT DOCUMENTS

| | | |
|---|---|---|
| CN | 102024934 A | 4/2011 |
| CN | 103004005 A | 3/2013 |

(Continued)

OTHER PUBLICATIONS

International Search Report for Application No. PCT/KR2014/003029 dated Jul. 11, 2014.

*Primary Examiner* — Patrick Ryan
*Assistant Examiner* — Ben Lewis
(74) *Attorney, Agent, or Firm* — Lerner, David, Littenberg, Krumholz & Mentlik, LLP

(57) ABSTRACT

Disclosed herein is an electrode laminate including a positive electrode having a positive electrode material coating layer formed on a positive electrode current collector, a negative electrode having a negative electrode material coating layer formed on a negative electrode current collector, and a porous polymer film interposed between the positive electrode and the negative electrode, wherein the positive electrode, the negative electrodes, and the porous polymer films are laminated in a height direction on the basis of a plane such that the negative electrodes constitute outermost electrodes of the electrode laminate, and the positive electrode material coating layer has a larger coating area than the negative electrode material coating layer.

18 Claims, 3 Drawing Sheets

(51) Int. Cl.
  *H01M 4/505* (2010.01)
  *H01M 4/485* (2010.01)
  *H01M 10/04* (2006.01)
  *H01M 10/0525* (2010.01)
  *H01M 2/16* (2006.01)
  *H01M 10/0583* (2010.01)

(52) U.S. Cl.
  CPC ....... *H01M 4/505* (2013.01); *H01M 10/0459* (2013.01); *H01M 10/0525* (2013.01); *H01M 10/0583* (2013.01); *Y02T 10/7011* (2013.01)

(58) Field of Classification Search
  CPC ..... H01M 4/485; H01M 4/505; Y02E 60/122; Y02T 10/7011
  See application file for complete search history.

(56) References Cited

U.S. PATENT DOCUMENTS

| | | | |
|---|---|---|---|
| 2003/0008206 A1 | 1/2003 | Hong | |
| 2003/0013012 A1 | 1/2003 | Ahn et al. | |
| 2006/0115723 A1* | 6/2006 | Ando | H01M 2/08 429/162 |
| 2006/0275664 A1* | 12/2006 | Ohzuku | C01G 23/005 429/220 |
| 2007/0172734 A1* | 7/2007 | Noguchi | H01M 4/485 429/223 |
| 2007/0224503 A1* | 9/2007 | Tsuda | H01M 4/70 429/209 |
| 2008/0213674 A1* | 9/2008 | Okada | H01M 4/136 429/344 |
| 2008/0280208 A1 | 11/2008 | Naoi et al. | |
| 2009/0029249 A1* | 1/2009 | Takami | H01M 4/366 429/188 |
| 2009/0202903 A1* | 8/2009 | Chiang | H01M 4/0426 429/203 |
| 2011/0027646 A1* | 2/2011 | Lee | H01M 4/131 429/188 |
| 2011/0064973 A1 | 3/2011 | Song | |
| 2011/0123841 A1 | 5/2011 | Ahn et al. | |
| 2012/0225345 A1* | 9/2012 | Kim | H01M 2/1653 429/145 |
| 2013/0122373 A1 | 5/2013 | Tamura et al. | |
| 2013/0266867 A1 | 10/2013 | Chang et al. | |

FOREIGN PATENT DOCUMENTS

| | | |
|---|---|---|
| EP | 2299532 A1 | 3/2011 |
| EP | 2557626 A2 | 2/2013 |
| EP | 2600458 A1 | 6/2013 |
| JP | 2001-210324 A | 8/2001 |
| JP | 2001229979 A | 8/2001 |
| JP | 2003045494 A | 2/2003 |
| JP | 2003168427 A | 6/2003 |
| JP | 2003523060 A | 7/2003 |
| JP | 2007305581 A | 11/2007 |
| JP | 2008282739 A | 11/2008 |
| JP | 2009158335 A | 7/2009 |
| JP | 2011065993 A | 3/2011 |
| JP | 2011113961 A | 6/2011 |
| JP | 2012033279 A | 2/2012 |
| JP | 2012243461 A | 12/2012 |
| KR | 20060092445 A | 8/2006 |
| KR | 20110058380 A | 6/2011 |
| KR | 20120070494 A | 6/2012 |
| KR | 20130011670 A | 1/2013 |
| WO | 2012014793 A1 | 2/2012 |

* cited by examiner ical Field

The present invention relates to an electrode laminate including a positive electrode having a positive electrode material coating layer formed on a positive electrode current collector, a negative electrode having a negative electrode material coating layer formed on a negative electrode current collector, and a porous polymer film interposed between the positive electrode and the negative electrode, wherein the positive electrode, the negative electrodes, and the porous polymer films are laminated in a height direction on the basis of a plane such that the negative electrodes constitute outermost electrodes of the electrode laminate, and the positive electrode material coating layer has a larger coating area than the negative electrode material coating layer.

ELECTRODE LAMINATE COMPRISING ELECTRODES WITH DIFFERENT SURFACE AREAS AND SECONDARY BATTERY EMPLOYED WITH THE SAME

CROSS REFERENCE TO RELATED APPLICATION

This application is a national phase entry under 35 U.S.C. § 371 of International Application No. PCT/KR2014/003029, filed Apr. 8, 2014, which claims priority to Korean Patent Application No. 10-2013-0039687, filed Apr. 11, 2013, the disclosures of which are incorporated herein by reference.

TECHNICAL FIELD

The present invention relates to an electrode laminate including a positive electrode having a positive electrode material coating layer formed on a positive electrode current collector, a negative electrode having a negative electrode material coating layer formed on a negative electrode current collector, and a porous polymer film interposed between the positive electrode and the negative electrode, wherein the positive electrode, the negative electrodes, and the porous polymer films are laminated in a height direction on the basis of a plane such that the negative electrodes constitute outermost electrodes of the electrode laminate, and the positive electrode material coating layer has a larger coating area than the negative electrode material coating layer.

BACKGROUND ART

As energy prices are increasing due to depletion of fossil fuels and interest in environmental pollution is escalating, the demand for environmentally-friendly alternative energy sources is bound to play an increasing role in future. Thus, research into techniques for generating various powers, such as nuclear energy, solar energy, wind energy, and tidal power, is underway, and power storage devices for more efficient use of the generated energy are also drawing much attention.

In particular, the demand for lithium secondary batteries as energy sources is rapidly increasing as mobile device technology continues to develop and the demand for the mobile devices continues to increase. In recent years, use of lithium secondary batteries as a power source of electric vehicles (EVs) and hybrid electric vehicles (HEVs) has been realized, and the market for lithium secondary batteries continues to expand to applications such as auxiliary power suppliers through smart-grid technology.

A lithium secondary battery has a structure in which an electrode assembly, in which a porous polymer film is interposed between a positive electrode and a negative electrode, each of which includes a coating layer applied to a current collector, is impregnated with a lithium salt-containing non-aqueous electrolyte. A lithium cobalt-based oxide, a lithium manganese-based oxide, a lithium nickel-based oxide, a lithium composite oxide, or the like is mainly used as a positive electrode coating layer. A carbon-based material is mainly used as a negative electrode coating layer.

However, in a lithium secondary battery using a carbon-based material as a negative electrode coating layer, irreversible capacity occurs in some lithium ions intercalated into a layered structure of the carbon-based material during a first charging and discharging cycle with the result that discharge capacity is reduced. In addition, a carbon material have a low oxidation/reduction potential of about 0.1 V with respect to potential of Li/Li$^+$ with the result that a non-aqueous electrolyte decomposes at the surface of the negative electrode, and the carbon material reacts with lithium to form a layer coated on the surface of the carbon material (a passivating layer or a solid electrolyte interface (SEI) film). The thickness and boundary states of such an SEI film vary according to an electrolyte system used and thus affect charge and discharge characteristics. Furthermore, in a secondary battery used in a field, such as a power tool, which requires high output characteristics, resistance increases due to such an SEI film having a small thickness with the result that a rate determining step (RDS) may occur. In addition, a lithium compound is produced at the surface of the negative electrode with the result that the reversible capacity of lithium gradually decreases as charging and discharging are repeated, and therefore discharge capacity is reduced and cycle deterioration occurs.

Meanwhile, the use of a lithium titanium oxide (LTO) as a negative electrode coating layer having structural stability and good cycle characteristics is under consideration. In a lithium secondary battery including such a LTO as a negative electrode coating layer, a negative electrode has a relatively high oxidation/reduction potential of about 1.5 V with respect to potential of Li/Li$^+$ with the result that decomposition of an electrolyte hardly occurs, and excellent cycle characteristics are obtained due to stability of a crystal structure thereof.

In addition, LiCoO$_2$ has been mainly used as a positive electrode coating layer. At present, however, an Ni-based material (Li(Ni—Co—Al)O$_2$), an Ni—Co—Mn-based material (Li(Ni—Co—Mn)O$_2$), and a high-stability spinel type Mn-based material (LiMn$_2$O$_4$) are used as other layered positive electrode coating layers. In particular, a spinel type manganese-based battery was applied to a mobile phone for a while. However, the spinel type manganese-based battery disappeared from the market of high-function mobile phones due to the reduction in energy density of the spinel type manganese-based battery although the spinel type manganese-based battery was not expensive. For this reason, much research has been conducted into methods of increasing energy density of a spinel type manganese-based positive electrode active material.

Several methods of increasing energy density of a lithium secondary battery may be considered. Among them is a method of increasing an operating potential of the battery, which is effective. Conventional lithium secondary batteries using LiCoO$_2$, LiNiO$_2$, and LiMn$_2$O$_4$ as a positive electrode coating layer have an operating potential of 4 V level. The average operating potential of lithium secondary batteries is 3.6 to 3.8 V. This is because the potential is decided according to oxidation and reduction of Co ions, Ni ions, or Mn ions. On the other hand, in a case in which a compound having a spinel structure in which some of Mn of LiMn$_2$O$_4$ is replaced with Ni, etc. is used as a positive electrode coating layer, it is possible to obtain a lithium secondary battery having an operating potential of 5 V level. In recent years, therefore, a lithium nickel manganese oxide (LNMO) has been examined as a positive electrode coating layer corresponding to a negative electrode coating layer made of a lithium titanium oxide.

However, in a lithium secondary battery including a lithium titanium oxide and a lithium nickel manganese oxide as a positive electrode coating layer and a negative electrode coating layer, the total energy and life stability of the lithium secondary battery are affected by the coating areas and arrangement of a positive electrode and a negative electrode. For this reason, it is important to provide proper coating areas and arrangement of the positive electrode and the negative electrode.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that in an electrode laminate including a positive electrode, a negative electrode, and a porous polymer film interposed between the positive electrode and the negative electrode, the life span characteristics and energy performance of a secondary battery are maximized in a case in which the coating area of a positive electrode material coating layer is greater than that of a negative electrode material coating layer, and the positive electrode, the negative electrode, and the porous polymer film are laminated in a height direction on the basis of a plane such that negative electrodes constitute the outermost electrodes of the electrode laminate.

It is an object of the present invention to provide an electrode laminate that is capable of exhibiting desired effects by the provision of proper coating areas of a positive electrode and a negative electrode and through proper arrangement of the positive electrode and the negative electrode without provision of an additional device or an additional process, thereby simplifying a manufacturing process and thus reducing manufacturing cost, and a secondary battery including the same.

Technical Solution

In accordance with one aspect of the present invention, the above and other objects can be accomplished by the provision of an electrode laminate including a positive electrode having a positive electrode material coating layer formed on a positive electrode current collector, a negative electrode having a negative electrode material coating layer formed on a negative electrode current collector, and a porous polymer film interposed between the positive electrode and the negative electrode, wherein the positive electrode, the negative electrodes, and the porous polymer films are laminated in a height direction on the basis of a plane such that the negative electrodes constitute outermost electrodes of the electrode laminate, and the positive electrode material coating layer has a larger coating area than the negative electrode material coating layer.

In a case in which a carbon-based material is used as a conventional negative electrode active material, a lithium compound is produced at the surface of the negative electrode with the result that reversible capacity is reduced. In order to solve this problem, it is necessary for the negative electrode to have larger capacity than the positive electrode. When the LTO is used, however, lithium plating may be prevented with the result that cell design through limitation in capacity of the negative electrode is possible.

In this case, the total capacity of the negative electrodes is less than or equal to that of the positive electrode (N/P ratio=1) such that cut-off voltage of the negative electrodes is reached first to prevent the increase in potential of the positive electrode. Consequently, it is possible to prevent the discharge of gas and generation of a by-product, which are caused due to operation of a cell at a potential at which the electrolyte is oxidized when a high-voltage positive electrode is used.

In the electrode laminate according to the present invention and a secondary battery including the same, the positive electrode material coating layer may have a larger coating area than the negative electrode material coating layer such that the capacity of the negative electrodes is less than that of the positive electrode.

In the electrode laminate, mass per unit area of a positive electrode active material may be greater than that of a negative electrode active material.

In addition, in the electrode laminate, a ratio in reversible capacity per unit area of the positive electrode to each negative electrode may be 1 or lower.

In this case, the positive electrode may have the same thickness as each negative electrode. Alternatively, the positive electrode may have a larger thickness than each negative electrode.

In addition, the positive electrode material coating layer may have the same volume as the negative electrode material coating layer. Alternatively, the positive electrode material coating layer may have a larger volume than the negative electrode material coating layer.

In a concrete example, the electrode laminate may includes a combination of a first radical cell, which has a structure in which a negative electrode is interposed between positive electrodes, and porous polymer films are interposed respectively between the positive electrodes and the negative electrode, and a second radical cell, which has a structure in which a positive electrode is interposed between negative electrodes, and porous polymer films are interposed respectively between the positive electrode and the negative electrodes.

The positive electrode material coating layer may include a spinel-structure lithium metal oxide represented by Formula 1 below.

$$Li_xM_yMn_{2-y}O_{4-z}A_z \qquad (1)$$

wherein $0.9 \leq x \leq 1.2$, $0 < y < 2$, and $0 \leq z < 0.2$, M is at least one element selected from a group consisting of Al, Mg, Ni, Co, Fe, Cr, V, Ti, Cu, B, Ca, Zn, Zr, Nb, Mo, Sr, Sb, W, Ti, and Bi, and A is at least one monovalent or divalent anion.

In addition, the oxide of Formula 1 may be represented by Formula 2 below.

$$Li_xNi_yMn_{2-y}O_4 \qquad (2)$$

wherein $0.9 \leq x \leq 1.2$ and $0.4 \leq y \leq 0.5$.

In this case, the lithium metal oxide may be $LiNi_{0.5}Mn_{1.5}O_4$ or $LiNi_{0.4}Mn_{1.6}O_4$. However, the present invention is not limited thereto.

In another concrete example, the negative electrode material coating layer comprises a lithium metal oxide represented by Formula 3 below.

$$Li_aM'_bO_{4-c}A_c \qquad (3)$$

wherein M' is at least one element selected from a group consisting of Ti, Sn, Cu, Pb, Sb, Zn, Fe, In, Al, and Zr, $0.1 \leq a \leq 4$ and $0.2 \leq b \leq 4$ in which a and b are determined according to oxidation number of M', $0 \leq c < 0.2$ in which c is determined according to oxidation number, and A is at least one monovalent or divalent anion.

In addition, the oxide of Formula 3 may be represented by Formula 4 below.

$$Li_aM'_bO_{4-c}A_c \qquad (4)$$

wherein M' is at least one element selected from a group consisting of Ti, Sn, Cu, Pb, Sb, Zn, Fe, In, Al, and Zr, $0.5 \leq a \leq 3$ and $1 \leq b \leq 2.5$ in which a and b are determined according to oxidation number of M', $0 \leq c < 0.2$ in which c is determined according to oxidation number, and A is at least one monovalent or divalent anion.

In this case, the lithium metal oxide may be $Li_{1.33}Ti_{1.67}O_4$ or $LiTi_2O_4$. However, the present invention is not limited thereto.

In a concrete example, a porous polymer film interposed between the first radical cell and the second radical cell may be a separation sheet for covering sides of the first radical cell and the second radical cell at which no electrode terminals are formed.

The electrode laminate may be manufactured by arranging the first radical cell and the second radical cell on the separation sheet and then winding or bending the separation sheet.

Other components of the electrode laminate according to the present invention will hereinafter be described.

The positive electrode is prepared by applying, drying, and pressing a positive electrode material, which is a mixture of a positive electrode active material, a conductive agent, and a binder, to opposite major surfaces of a positive electrode current collector. A filler may be added to the mixture as needed.

Generally, the positive electrode current collector has a thickness of 3 to 500 μm. The positive electrode current collector is not particularly restricted so long as the positive electrode current collector exhibits high conductivity while the positive electrode current collector does not induce any chemical change in a battery to which the positive electrode current collector is applied. For example, the cathode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. The positive electrode current collector may have a micro uneven pattern formed at the surface thereof so as to increase adhesive strength of the positive electrode active material. The positive electrode current collector may be configured in various forms, such as a film, a sheet, a foil, a net, a porous body, a foam body, and a non-woven fabric body.

The conductive agent is generally added so that the conductive agent has 1 to 50 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 50 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

On the other hand, the negative electrode is prepared by applying, drying and pressing a negative electrode material including a negative electrode active material to a negative electrode current collector. The conductive agent, the binder and the filler, which were previously described, may be selectively added to the negative electrode active material as needed.

Generally, the negative electrode current collector has a thickness of 3 to 500 μm. The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro uneven pattern formed at the surface thereof so as to increase adhesive strength of the negative electrode active material. The negative electrode current collector may be configured in various forms, such as a film, a sheet, a foil, a net, a porous body, a foam body, and a non-woven fabric body.

Each porous polymer film is interposed between the positive electrode and the negative electrode. As the porous polymer film, for example, an insulative thin film exhibiting high ion permeability and mechanical strength may be used. The porous polymer film generally has a pore diameter of 0.01 to 10 μm and a thickness of 5 to 300 μm. As the material for the porous polymer film, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may also function as a separator.

In accordance with another aspect of the present invention, there is provided a lithium secondary battery configured to have a structure in which the electrode laminate with the above-stated construction, is mounted in a case in a sealed state, wherein the electrode laminate is impregnated with a lithium salt-containing electrolyte.

Other components of the secondary battery according to the present invention will hereinafter be described.

The lithium salt-containing electrolyte is composed of an electrolyte and lithium salt. A non-aqueous organic solvent, an organic solid electrolyte, or an inorganic solid electrolyte may be used as the electrolyte. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$-$LiI$-$LiOH$, and $Li_3PO_4$—$Li_2S$—$SiS_2$.

The lithium salt may be a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. According to circumstances, in order to impart incombustibility, the non-aqueous electrolyte may further include halogen-containing solvents, such as carbon tetrachloride and ethylene trifluoride. Furthermore, in order to improve high-temperature retention characteristics, the electrolyte may further include carbon dioxide gas. In addition, the electrolyte may further include fluoro-ethylene carbonate (FEC) or propene sultone (PRS).

In a preferred embodiment, a lithium salt-containing non-aqueous electrolyte may be prepared by adding a lithium salt, such as $LiPF_6$, $LiClO_4$, $LiBF_4$, or $LiN(SO_2CF_3)_2$, to a mixed solvent of a cyclic carbonate, such as EC or PC, which is a high dielectric solvent, and a linear carbonate, such as DEC, DMC, or EMC, which is a low-viscosity solvent.

The lithium secondary battery may have a capacity retention rate of 70% or higher after 100 cycles, in each of which the lithium secondary battery is charged at a charging rate of 1 C and the lithium secondary battery is discharged at a discharging rate of 1 C at a temperature of 25° C.

In addition, the lithium secondary battery may be a lithium ion battery or a lithium ion polymer battery.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
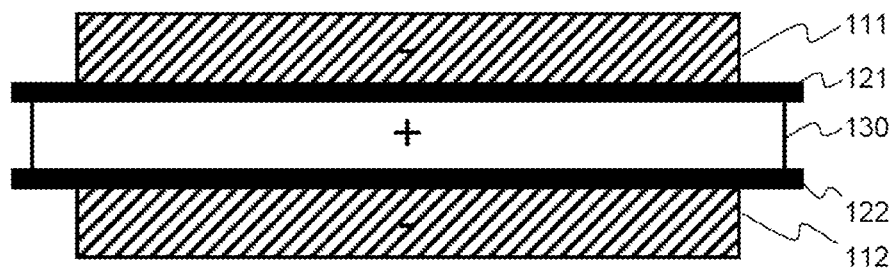
FIG. 1 is a typical view showing an electrode laminate according to an embodiment of the present invention.

FIG. 1 is a typical view showing an electrode laminate according to the present invention.

Referring to FIG. 1, an electrode laminate 100 according to an embodiment of the present invention is configured to have a structure including a positive electrode 130 having a positive electrode material coating layer formed on a positive electrode current collector, negative electrodes 111 and 112 each having a negative electrode material coating layer formed on a negative electrode current collector, and porous polymer films 121 and 122 interposed respectively between the positive electrode 130 and the negative electrodes 111 and 112. The positive electrode 130, the negative electrodes 111 and 112, and the porous polymer films 121 and 122 are laminated in a height direction on the basis of a plane such that the negative electrodes 111 and 112 constitute the outermost electrodes of the electrode laminate 100. The coating area of the positive electrode material coating layer is greater than that of the negative electrode material coating layer.

That is, the electrode laminate 100 is configured to have a structure in which the positive electrode 130 having the relatively large coating area is interposed between the two negative electrodes 111 and 112 having the relatively small coating area such that the positive electrode 130 faces the two negative electrodes 111 and 112 in a state in which the porous polymer films 121 and 122 are interposed respectively between the positive electrode 130 and the negative electrodes 111 and 112.

In this case, the positive electrode 130 includes a lithium nickel manganese oxide as an active material, and each of the negative electrodes 111 and 112 includes a lithium titanium oxide as an active material.

Figure 2:
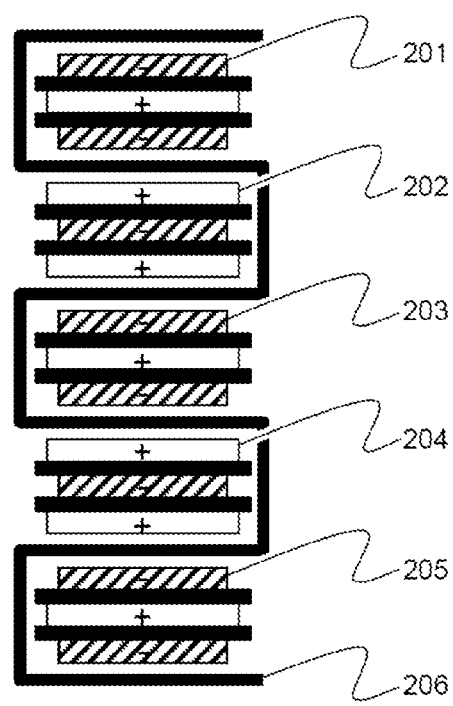
FIG. 2 is a typical view showing an electrode laminate according to another embodiment of the present invention.

FIG. 2 is a typical view showing an electrode laminate according to another embodiment of the present invention.

Referring to FIG. 2, an electrode laminate 200 according to the present invention is configured to have a structure including a combination of first radical cells 202 and 204, each of which has a structure in which a negative electrode is interposed between positive electrodes, and porous polymer films are interposed respectively between the positive electrodes and the negative electrode, and second radical cells 201, 203, and 205, each of which has a structure in which a positive electrode is interposed between negative electrodes, and porous polymer films are interposed respectively between the positive electrode and the negative electrodes.

In addition, a positive electrode material coating layer of each positive electrode constituting the radical cells 201, 202, 203, 204, and 205 has a larger coating area than a negative electrode material coating layer of each negative electrode constituting the radical cells 201, 202, 203, 204, and 205.

In addition, each positive electrode constituting the radical cells 201, 202, 203, 204, and 205 includes a lithium nickel manganese oxide as an active material, and each negative electrode constituting the radical cells 201, 202, 203, 204, and 205 includes a lithium titanium oxide as an active material.

A porous polymer film 206 interposed between the first radical cells 202 and 204 and the second radical cells 201, 203, and 205 of the electrode laminate 200 is a separation sheet for covering sides of the first radical cells 202 and 204 and the second radical cells 201, 203, and 205 at which no electrode terminals are formed.

In addition, the electrode laminate 200 is manufactured by arranging the first radical cells 202 and 204 and the second radical cells 201, 203, and 205 on the separation sheet and then bending the separation sheet.

Figure 3:
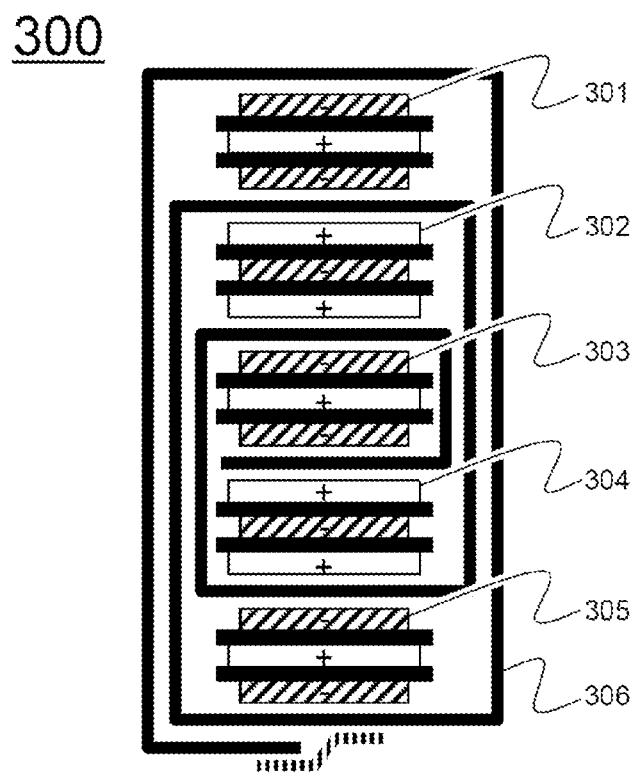
FIG. 3 is a typical view showing an electrode laminate according to a further embodiment of the present invention.
Figure 4:
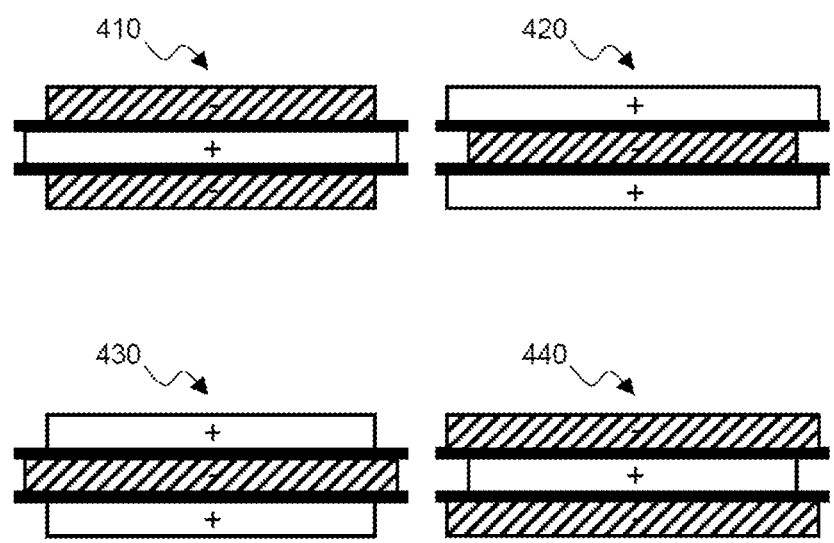
FIG. 4 is a typical view showing electrode laminates according to example 1 of the present invention and comparative examples 1 to 3.

FIG. 3 is a typical view showing an electrode laminate according to a further embodiment of the present invention.

Referring to FIG. 3, an electrode laminate 300 according to the present invention is configured to have a structure including a combination of first radical cells 302 and 304, each of which has a structure in which a negative electrode is interposed between positive electrodes, and porous polymer films are interposed respectively between the positive electrodes and the negative electrode, and second radical cells 301, 303, and 305, each of which has a structure in which a positive electrode is interposed between negative electrodes, and porous polymer films are interposed respectively between the positive electrode and the negative electrodes, in the same manner as in the electrode laminate 200 of FIG. 2.

In addition, a positive electrode material coating layer of each positive electrode constituting the radical cells 301, 302, 303, 304, and 305 has a larger coating area than a negative electrode material coating layer of each negative electrode constituting the radical cells 301, 302, 303, 304, and 305.

In addition, each positive electrode constituting the radical cells 301, 302, 303, 304, and 305 includes a lithium nickel manganese oxide as an active material, and each negative electrode constituting the radical cells 301, 302, 303, 304, and 305 includes a lithium titanium oxide as an active material.

A porous polymer film 306 interposed between the first radical cells 302 and 304 and the second radical cells 301, 303, and 305 of the electrode laminate 300 is a separation sheet for covering sides of the first radical cells 302 and 304 and the second radical cells 301, 303, and 305 at which no electrode terminals are formed.

In addition, the electrode laminate 300 is manufactured by arranging the first radical cells 302 and 304 and the second radical cells 301, 303, and 305 on the separation sheet and then winding the separation sheet.

Hereinafter, an example of the present invention will be described in detail. It should be noted, however, that the scope of the present invention is not limited by the illustrated example.

<Example 1>

95 wt % of $LiNi_{0.5}Mn_{1.5}O_4$ as a positive electrode active material, 2.5 wt % of Super-P, and 2.5 wt % of SBR/CMC were put and mixed in a mixer to prepare a positive electrode mixture. Subsequently, the positive electrode mixture was coated, rolled, and dried over aluminum foil having a thickness of 20 μm such that the positive electrode mixture had a thickness of 200 μm to manufacture a positive electrode.

95 wt % of $Li_{1.33}Ti_{1.67}O_4$ as a negative electrode active material, 2.5 wt % of Super-P, and 2.5 wt % of SBR/CMC were put and mixed in a mixer to prepare a negative electrode mixture. Subsequently, the negative electrode mixture was coated, rolled, and dried over copper foil having a thickness of 20 μm such that the negative electrode mixture had a thickness of 200 μm to manufacture a negative electrode, a negative electrode material coating layer of which had a coating area equivalent to 90% that of a positive electrode material coating layer of the positive electrode.

One positive electrode was interposed between two negative electrodes in a state in which porous polymer films were interposed respectively between the positive electrode and the negative electrodes to manufacture an electrode laminate.

The electrode laminate was impregnated with an a carbonate electrolytic solution which contained 1 mole of $LiPF_6$ dissolved therein and in which a volumetric ratio of EC:PC was 1:1 as an electrolyte to manufacture a battery.

<Comparative Example 1>

A battery was manufactured in the same manner as in Example 1 except that an electrode laminate configured to have a structure in which one negative electrode was interposed between two positive electrodes in a state in which porous polymer films were interposed respectively between the negative electrode and the positive electrodes such that the positive electrodes constitute the outermost electrodes of the electrode laminate was used.

<Comparative Example 2>

A battery was manufactured in the same manner as in Example 1 except that an electrode laminate configured to have a structure in which one negative electrode was interposed between two positive electrodes in a state in which porous polymer films were interposed respectively between the negative electrode and the positive electrodes, and a positive electrode material coating layer of each positive electrode had a coating area equivalent to 90% that of a negative electrode material coating layer of the negative electrode was used.

<Comparative Example 3>

A battery was manufactured in the same manner as in Example 1 except that an electrode laminate configured to have a structure in which a positive electrode material coating layer of the positive electrode had a coating area equivalent to 90% that of a negative electrode material coating layer of each negative electrode was used.

<Experimental Example 1>

The batteries manufactured according to Example 1 and Comparative examples 1, 2, and 3 were repeatedly charged and discharged 100 times under a temperature condition of 25° C., a charging condition of 1 C, and a discharging condition of 1 C to evaluate cycle characteristics of the batteries. The results are shown in graphs of FIGS. 5 and 6.

Figure 5:
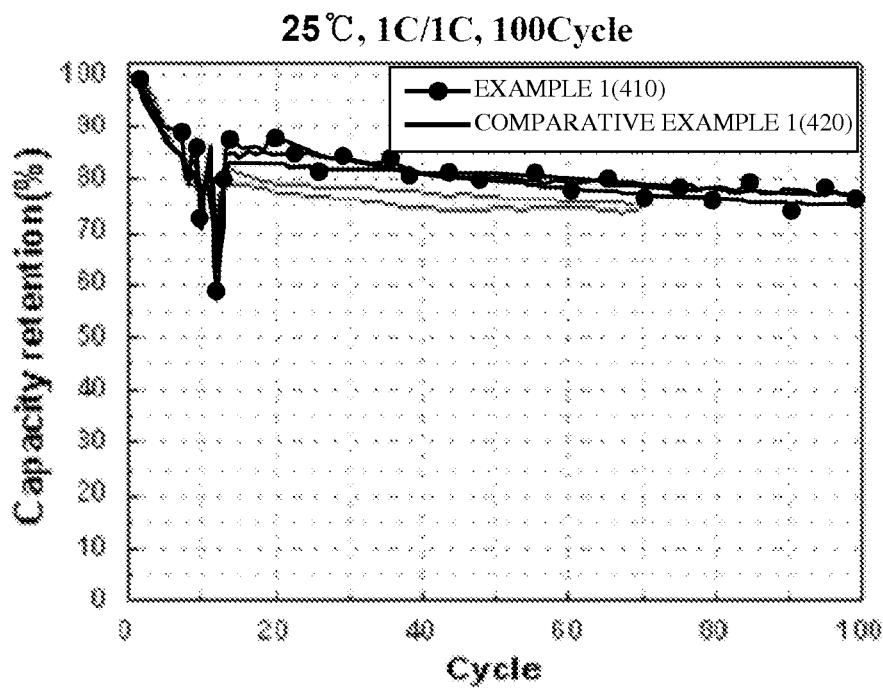
FIG. 5 is a typical view showing performance experimental results of the electrode laminates according to example 1 of the present invention and comparative example 2 based on cycles.
Figure 6:
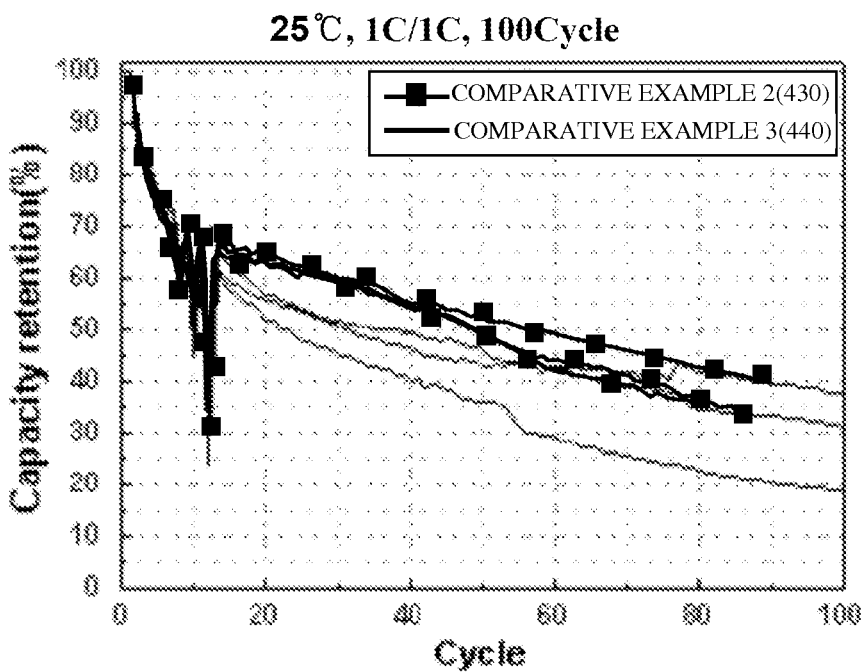
FIG. 6 is a typical view showing performance experimental results of the electrode laminates according to comparative examples 2 and 3 based on cycles.

Referring to graphs of FIGS. 5 and 6, the batteries manufactured according to Example 1 and Comparative example 1 including electrode laminates 410 and 420, in which the coating area of the negative electrode is equivalent to 90% that of the positive electrode, exhibits higher life span characteristics and energy performance of the batteries manufactured according to Comparative examples 2 and 3 including electrode laminates 430 and 440, in which the coating area of the positive electrode is equivalent to 90% that of the negative electrode.

Particularly, referring to FIG. 5, in the battery manufactured according to Example 1, the electrode laminate 410 is configured such that one positive electrode having a relatively large coating area is interposed between two negative electrodes each having a relatively small coating area in a state in which porous polymer films are interposed respectively between the positive electrode and the negative electrodes, thereby maximizing the life span characteristics and energy performance of a secondary battery.

In the electrode laminate according to the present invention and the secondary battery including the same, therefore, the coating area of the positive electrode material coating layer is greater than that of the negative electrode material coating layer, and the positive electrode, the negative electrodes, and the porous polymer films are laminated in the height direction on the basis of the plane such that the negative electrodes constitute the outermost electrodes of the electrode laminate. Consequently, the present invention has the effect of maximizing the life span characteristics and energy performance of the secondary battery. In addition, it is possible to exhibit desired effects by the provision of proper coating areas of the positive electrode and the negative electrodes and through proper arrangement of the positive electrode and the negative electrodes without provision of an additional device or an additional process. Consequently, the present invention has the effect of simplifying a manufacturing process and thus reducing manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in an electrode laminate according to the present invention and a secondary battery including the same, the coating area of a positive electrode material coating layer is greater than that of a negative electrode material coating layer, and a positive electrode, negative electrodes, and porous polymer films are laminated in a height direction on the basis of a plane such that the negative electrodes constitute the outermost electrodes of the electrode laminate. Consequently, the present invention has the effect of maximizing the life span characteristics and energy performance of the secondary battery. In addition, it is possible to exhibit desired effects by the provision of proper coating areas of the positive electrode and the negative electrodes and through proper arrangement of the positive electrode and the negative electrodes without provision of an additional device or an additional process. Consequently, the present invention has the effect of simplifying a manufacturing process and thus reducing manufacturing cost.

The invention claimed is:

1. A lithium secondary battery configured to have a structure in which an electrode laminate is mounted in a case in a sealed state, wherein the electrode laminate comprises:
   a positive electrode having a positive electrode material coating layer formed on a positive electrode current collector;
   a negative electrode having a negative electrode material coating layer formed on a negative electrode current collector; and
   a porous polymer film interposed between the positive electrode and the negative electrode, wherein
   the positive electrode, the negative electrodes, and the porous polymer films are laminated in a height direction on the basis of a plane such that the negative electrodes constitute outermost electrodes of the electrode laminate, and
   the positive electrode material coating layer has a larger coating area than the negative electrode material coating layer,
   wherein the lithium secondary battery has a capacity retention rate of 70% or higher after 100 cycles, in each of which the lithium secondary battery is charged at a charging rate of 1 C and the lithium secondary battery is discharged at a discharging rate of 1 C at a temperature of 25° C.

2. The lithium secondary battery according to claim 1, wherein mass per unit area of a positive electrode active material is greater than that of a negative electrode active material.

3. The lithium secondary battery according to claim 1, wherein a ratio in reversible capacity per unit area of the positive electrode to each negative electrode is 1 or lower.

4. The lithium secondary battery according to claim 1, wherein the positive electrode has the same thickness as each negative electrode.

5. The lithium secondary battery according to claim 1, wherein the positive electrode has a larger thickness than each negative electrode.

6. The lithium secondary battery according to claim 1, wherein the positive electrode material coating layer has the same volume as the negative electrode material coating layer.

7. The lithium secondary battery according to claim 1, wherein the positive electrode material coating layer has a larger volume than the negative electrode material coating layer.

8. The lithium secondary battery according to claim 1, wherein the electrode laminate comprises a combination of a first radical cell, which has a structure in which a negative electrode is interposed between positive electrodes, and porous polymer films are interposed respectively between the positive electrodes and the negative electrode, and a second radical cell, which has a structure in which a positive electrode is interposed between negative electrodes, and porous polymer films are interposed respectively between the positive electrode and the negative electrodes.

9. The lithium secondary battery according to claim 8, wherein a porous polymer film interposed between the first radical cell and the second radical cell is a separation sheet for covering sides of the first radical cell and the second radical cell at which no electrode terminals are formed.

10. The lithium secondary battery according to claim 9, wherein the electrode laminate is manufactured by arranging the first radical cell and the second radical cell on the separation sheet and then winding or bending the separation sheet.

11. The lithium secondary battery according to claim 1, wherein the positive electrode material coating layer comprises a spinel-structure lithium metal oxide represented by Formula 1 below:

$$Li_xM_yMn_{2-y}O_{4-z}A_z \qquad (1)$$

wherein $0.9 \leq x \leq 1.2$, $0 < y < 2$, and $0 \leq z < 0.2$,

M is at least one element selected from a group consisting of Al, Mg, Ni, Co, Fe, Cr, V, Ti, Cu, B, Ca, Zn, Zr, Nb, Mo, Sr, Sb, W, Ti, and Bi, and A is at least one monovalent or divalent anion.

12. The lithium secondary battery according to claim 11, wherein the oxide of Formula 1 is represented by Formula 2 below:

$$Li_xNi_yMn_{2-y}O_4 \qquad (2)$$

wherein $0.9 < x < 1.2$ and $0.4 < y < 0.5$, and

A is at least one monovalent or divalent anion.

13. The lithium secondary battery according to claim 12, wherein the lithium metal oxide is $LiNi_{0.5}Mn_{1.5}O_4$ or $LiNi_{0.4}Mn_{1.6}O_4$.

14. The lithium secondary battery according to claim 1, wherein the negative electrode material coating layer comprises a lithium metal oxide represented by Formula 3 below:

$$Li_aM'_bO_{4-c}A_c \qquad (3)$$

wherein M' is at least one element selected from a group consisting of Ti, Sn, Cu, Pb, Sb, Zn, Fe, In, Al, and Zr, $0.1 < a < 4$ and $0.2 < b < 4$ in which a and b are determined according to oxidation number of M', $0 < c < 0.2$ in which c is determined according to oxidation number, and A is at least one monovalent or divalent anion.

15. The lithium secondary battery according to claim 14, wherein the oxide of Formula 3 is represented by Formula 4 below:

$$Li_aM'_bO_{4-c}A_c \qquad (4)$$

wherein M' is at least one element selected from a group consisting of Ti, Sn, Cu, Pb, Sb, Zn, Fe, In, Al, and Zr, $0.5 < a < 3$ and $1 < b < 2.5$ in which a and b are determined according to oxidation number of M', $0 < c < 0.2$ in which c is determined according to oxidation number, and A is at least one monovalent or divalent anion.

16. The lithium secondary battery according to claim 15, wherein the lithium metal oxide is $Li_{1.33}Ti_{1.67}O_4$ or $LiTi_2O_4$.

17. The lithium secondary battery according to claim 1, wherein the lithium secondary battery is a lithium ion battery.

18. The lithium secondary battery according to claim 1, wherein the lithium secondary battery is a lithium ion polymer battery.

* * * * *